(12) United States Patent
Duarte et al.

(10) Patent No.: US 11,900,519 B2
(45) Date of Patent: Feb. 13, 2024

(54) DISENTANGLING LATENT REPRESENTATIONS FOR IMAGE REENACTMENT

(71) Applicant: ADOBE INC., San Jose, CA (US)

(72) Inventors: Kevin Duarte, Orlando, FL (US);
Wei-An Lin, San Jose, CA (US);
Ratheesh Kalarot, San Jose, CA (US);
Shabnam Ghadar, Menlo Park, CA (US); Jingwan Lu, Sunnyvale, CA (US); Elya Shechtman, Seattle, WA (US); John Thomas Nack, San Jose, CA (US)

(73) Assignee: ADOBE INC., San Jose, CA (US)

( * ) Notice: Subject to any disclaimer, the term of this patent is extended or adjusted under 35 U.S.C. 154(b) by 93 days.

(21) Appl. No.: 17/455,318

(22) Filed: Nov. 17, 2021

(65) Prior Publication Data
US 2023/0154088 A1    May 18, 2023

(51) Int. Cl.
*G06T 13/40*    (2011.01)
*G06T 5/50*    (2006.01)
*G06N 3/045*    (2023.01)

(52) U.S. Cl.
CPC ............ *G06T 13/40* (2013.01); *G06N 3/045* (2023.01); *G06T 5/50* (2013.01)

(58) Field of Classification Search
CPC ............ G06T 13/40; G06T 5/50; G06N 3/045
See application file for complete search history.

(56) References Cited

U.S. PATENT DOCUMENTS

| | | | | |
|---|---|---|---|---|
| 9,576,351 | B1* | 2/2017 | Barzel | G06T 11/001 |
| 10,657,676 | B1* | 5/2020 | Rehfeld | H04L 51/52 |
| 11,526,972 | B2* | 12/2022 | Vaezi Joze | G06V 40/161 |
| 11,645,798 | B1* | 5/2023 | Demyanov | G06N 3/08 |
| | | | | 345/474 |

(Continued)

FOREIGN PATENT DOCUMENTS

| | | | |
|---|---|---|---|
| CN | 111783658 A | * | 10/2020 |
| CN | 112101087 A | * | 12/2020 |

OTHER PUBLICATIONS

Lee, H. Y., Tseng, H. Y., Huang, J. B., Singh, M., & Yang, M. H. (2018). Diverse image-to-image translation via disentangled representations. In Proceedings of the European conference on computer vision (ECCV) (pp. 35-51).*

(Continued)

*Primary Examiner* — Sarah Lhymn
(74) *Attorney, Agent, or Firm* — F. CHAU & ASSOCIATES, LLC

(57) ABSTRACT

Systems and methods for image processing are described. Embodiments of the present disclosure encode features of a source image to obtain a source appearance encoding that represents inherent attributes of a face in the source image; encode features of a target image to obtain a target non-appearance encoding that represents contextual attributes of the target image; combine the source appearance encoding and the target non-appearance encoding to obtain combined image features; and generate a modified target image based on the combined image features, wherein the modified target image includes the inherent attributes of the face in the source image together with the contextual attributes of the target image.

17 Claims, 12 Drawing Sheets

$w_p$: StyleGAN Latent
$w_a$: Appearance Features
$w_n$: Non-Appearance Features
$w'_p$: Reconstructed Latent

(56) References Cited

U.S. PATENT DOCUMENTS

| | | | | |
|---|---|---|---|---|
| 2018/0350030 A1* | 12/2018 | Simons | | G06T 5/002 |
| 2019/0042882 A1* | 2/2019 | Kim | | G06N 3/088 |
| 2019/0046068 A1* | 2/2019 | Ceccaldi | | G06V 10/764 |
| 2019/0049540 A1* | 2/2019 | Odry | | G01R 33/543 |
| 2019/0180086 A1* | 6/2019 | Zhang | | G06F 18/2413 |
| 2020/0151559 A1* | 5/2020 | Karras | | G06N 3/088 |
| 2020/0226724 A1* | 7/2020 | Fang | | G06F 18/214 |
| 2020/0234406 A1* | 7/2020 | Ren | | G06T 5/001 |
| 2020/0372621 A1* | 11/2020 | Naruniec | | G06T 7/32 |
| 2021/0042503 A1* | 2/2021 | Karras | | G06T 7/70 |
| 2021/0049468 A1* | 2/2021 | Karras | | G06V 40/168 |
| 2021/0150197 A1* | 5/2021 | Kokkinos | | G06V 10/74 |
| 2021/0150357 A1* | 5/2021 | Karras | | G06N 3/08 |
| 2021/0166088 A1* | 6/2021 | Chen | | G06V 10/87 |
| 2021/0193184 A1* | 6/2021 | Yuan | | G06F 40/205 |
| 2021/0201458 A1* | 7/2021 | Wu | | G06T 11/60 |
| 2021/0209464 A1* | 7/2021 | Bala | | G06N 20/00 |
| 2021/0217219 A1* | 7/2021 | Zhou | | G06T 15/04 |
| 2021/0232803 A1* | 7/2021 | Fu | | G06N 3/047 |
| 2021/0264655 A1* | 8/2021 | Chen | | G06N 3/045 |
| 2021/0287430 A1* | 9/2021 | Li | | G06V 10/776 |
| 2021/0334942 A1* | 10/2021 | Wang | | G06T 5/50 |
| 2021/0358164 A1* | 11/2021 | Liu | | G06V 10/764 |
| 2021/0383154 A1* | 12/2021 | Li | | G06F 18/214 |
| 2022/0012596 A1* | 1/2022 | Nie | | G06T 11/60 |
| 2022/0044352 A1* | 2/2022 | Liao | | G06N 20/20 |
| 2022/0157014 A1* | 5/2022 | Sevastopolskiy | | G06T 15/60 |
| 2022/0172710 A1* | 6/2022 | Brady | | G06N 3/044 |
| 2022/0198266 A1* | 6/2022 | Chakraborty | | G06N 3/088 |
| 2022/0222781 A1* | 7/2022 | Jacob | | G06N 3/084 |
| 2022/0237843 A1* | 7/2022 | Saragih | | G06T 15/506 |
| 2022/0254152 A1* | 8/2022 | Min | | G06V 10/82 |
| 2022/0284646 A1* | 9/2022 | Saha | | G06T 7/10 |
| 2022/0309633 A1* | 9/2022 | Davies | | G06T 7/11 |
| 2022/0319060 A1* | 10/2022 | Marinenko | | G06Q 30/0276 |
| 2022/0319127 A1* | 10/2022 | Tkachenko | | G06V 10/82 |
| 2022/0319229 A1* | 10/2022 | Babanin | | G06T 11/60 |

OTHER PUBLICATIONS

Siarohin, et al., "First Order Motion Model for Image Animation", 33rd Conference on Neural Information Processing Systems (NeurIPS 2019), Advances in Neural Information Processing Systems, 32, 7137-7147.

Fox, et al., "StyleVideoGAN: A Temporal Generative Model using a Pretrained StyleGAN", arXiv:2107.07224v1 [cs.CV] Jul. 15, 2021, 18 pages.

Tian, et al., "A Good Image Generator is What You Need for High-Resolution Video Synthesis", arXiv:2104.15069v1 [cs.CV] Apr. 30, 2021, 23 pages.

Deng, et al., "Accurate 3D Face Reconstruction with Weakly-Supervised Learning: From Single Image to Image Set", In Proceedings of the IEEE/CVF Conference on Computer Vision and Pattern Recognition Workshops, 2019, 11 pages.

* cited by examiner

DISENTANGLING LATENT REPRESENTATIONS FOR IMAGE REENACTMENT

BACKGROUND

The following relates generally to image processing, and more specifically to image attribute transfer.

Digital image processing refers to the use of a computer to edit a digital image using an algorithm or a processing network. In some examples, an image may be processed using image processing software. Image processing software is commonly used for image editing, object detection, robot navigation, etc. For example, image editing may be performed to change features or to modify an image based on a user request. In some cases, image processing can be used to perform image animation.

Image animation automatically generates videos using appearance information from a source image and a desired set of motion patterns. In some cases, motion-driven image animation may be performed on well-constrained domains such as faces. For example, a source image that depicts the face of a person can be animated to depict changing facial expressions.

However, conventional animation methods are not capable of performing image animation while maintaining the identity of a person in the source image. Additionally, the motion performed in the output animation (i.e., video) may not look realistic. Therefore, there is a need in the art for improved image animation systems that maintains the identity of a source image and provides a realistic motion in an output.

SUMMARY

The present disclosure describes systems and methods for image processing. Embodiments of the present disclosure include an image processing apparatus configured to generate an animation output based on a source image and a driving video. The animation can be generated using a disentangling network and a reconstruction network. The disentangling network generates an encoding representing appearance features of the source image and another encoding (or set of encodings) representing non-appearance features from the driving video (i.e., representing individual frames of the driving video). Then, a reconstruction network can combine the appearance encoding from the source image with the non-appearance features from the driving video to generate an output image.

A method, apparatus, non-transitory computer readable medium, and system for image processing are described. One or more embodiments of the method, apparatus, non-transitory computer readable medium, and system include encoding features of a source image to obtain a source appearance encoding that represents inherent attributes of a face in the source image; encoding features of a target image to obtain a target non-appearance encoding that represents contextual attributes of the target image; combining the source appearance encoding and the target non-appearance encoding to obtain combined image features; and generating a modified target image based on the combined image features, wherein the modified target image includes the inherent attributes of the face in the source image together with the contextual attributes of the target image.

A method, apparatus, non-transitory computer readable medium, and system for image processing are described. One or more embodiments of the method, apparatus, non-transitory computer readable medium, and system include receiving a training set including a source image and a target image; encoding features of the source image using a disentangling network to obtain a source appearance encoding and a source non-appearance encoding, wherein the source appearance encoding represents inherent attributes of a face in the source image and the source non-appearance encoding represents contextual attributes of the source image; encoding features of the target image using the disentangling network to obtain a target appearance encoding and a target non-appearance encoding, wherein the target appearance encoding represents inherent attributes of a face in the target image and the target non-appearance encoding represents contextual attributes of the target image; computing a loss function based on the source appearance encoding, the source non-appearance encoding, the target appearance encoding, and the target non-appearance encoding; and updating parameters of the disentangling network based on the loss function.

An apparatus, system, and method for image processing are described. One or more embodiments of the apparatus, system, and method include a disentangling network configured to encode features of a source image to obtain a source appearance encoding and a source non-appearance encoding and to encode features of a target image to obtain a target appearance encoding and a target non-appearance encoding; a reconstruction network configured to combine the source appearance encoding and the target non-appearance encoding to obtain combined image features; and a generator network configured to generate a modified target image based on the combined image features, wherein the modified target image includes inherent attributes of a face in the source image together with contextual attributes of the target image.

DETAILED DESCRIPTION

Figure 1:
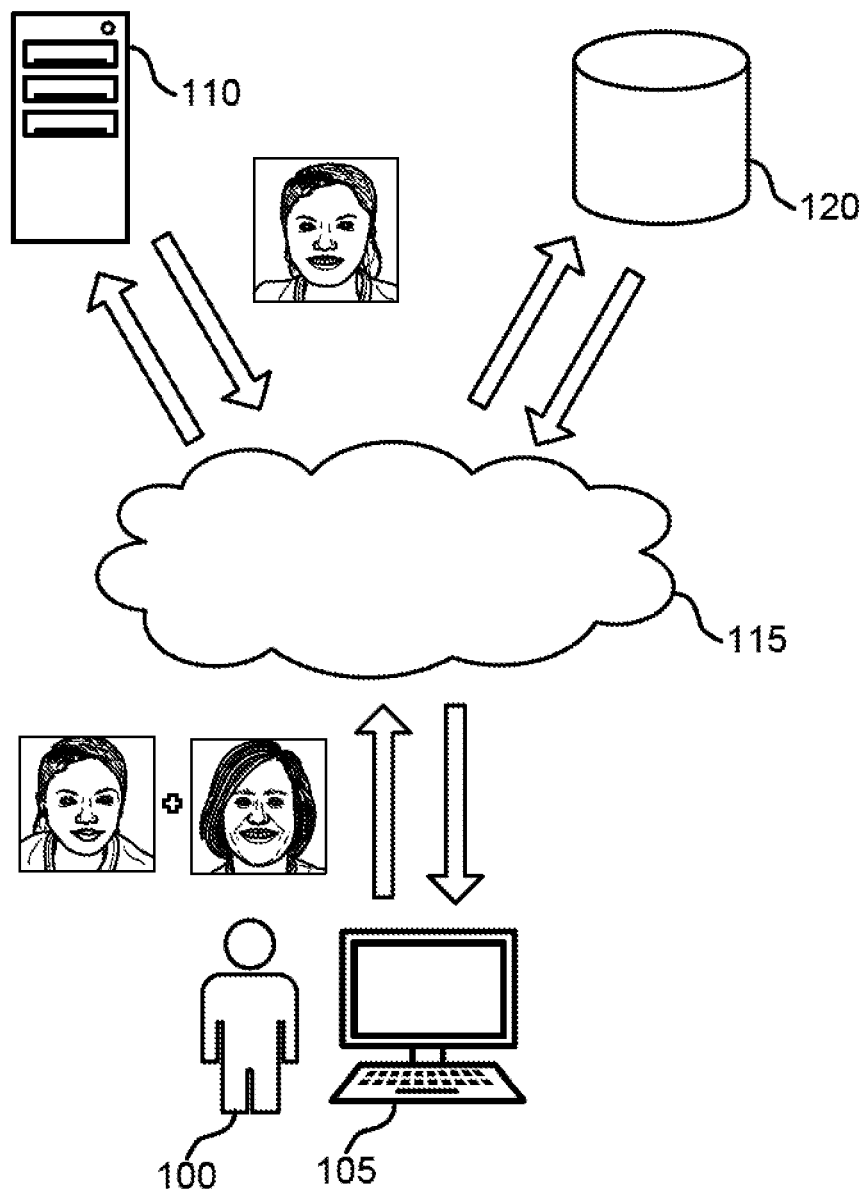
FIG. 1 shows an example of an appearance transfer system according to aspects of the present disclosure.

The present disclosure describes systems and methods for image processing. Embodiments of the present disclosure include an image processing apparatus configured to generate an animation output based on a source image and a driving video. The animation is generated using a disentangling and a reconstruction network. In some embodiments, the disentangling network and the reconstruction network are both multi-layer neural networks. A disentangled vector representing appearance attributes of the source image can be combined with non-appearance features of the driving video to generate the desired face animation. A combination of losses can be used to train the disentangling network, which separates the appearance and non-appearance features, and the reconstruction network which combines the feature vectors to form latent representations in a latent space of generative adversarial networks (GANs). For example, the appearance and non-appearance vectors can be disentangled into appearance features such as identity, hairstyle, etc. and non-appearance features such as face pose, face expression, etc.

Image animation systems can be used to generate animation of an object in a source image according to the motion of a driving video. For example, a first order motion model uses a deep learning-based framework to generate videos with virtual face expressions. The first order model learns the motion of a given video sequence and warps the target image to follow the motion. In some cases, the generated videos are low in resolution and contain multiple visual artifacts.

A GAN can also learn to generate motion by modifying vectors in a latent space. However, conventional GAN-based methods transfer motion based on videos on which the network is trained. As a result, conventional GAN-based methods generate random motion artifacts and do not transfer motion accurately from the video provided. Furthermore, conventional GAN-based systems can modify the identity of the source image when generating the motion.

Embodiments of the present disclosure include an image encoder and GAN-based image animation system that performs motion transfer based on user provided videos. The motion transfer refers to transferring the motion of a driving video to a source image involving another face. In some cases, a disentangling network ensures that the appearance features are consistent for a person.

The reconstruction network combines the disentangled latent spaces using non-appearance features of driving video frames and appearance features from the source image. In one example, a CNN encoder and GAN (e.g., a StyleGAN2) are pre-trained and fixed. A combination of losses ensure that the images generated using same appearance features have the same identity and images generated using same non-appearance features have the same expression and pose. As a result, embodiments of the present disclosure can provide high-resolution animated output of the source image based on motion of a driving video.

By applying the unconventional training method of disentangling and reconstruction, embodiments of the present disclosure perform motion transfer for face videos. In some cases, the disentangling network is trained using contrastive and consistency losses to separate the appearance and non-appearance features from latent space representations. The reconstruction network is trained to use the appearance and non-appearance features and reconstruct the original input latent space. Thus, the disentangling network outputs the same appearance and non-appearance features after swapping of features and reconstruction.

In some examples, embodiments of the present disclosure can be implemented in an appearance transfer system, as described with reference to FIGS. 1-3. An example architecture for a machine learning model trained for performing appearance transfer is described with reference to FIGS. 4 and 5. Methods for performing appearance transfer are described with reference to FIGS. 6-8, and example training methods are described with reference to FIGS. 9-12.

Appearance Transfer

FIG. 1 shows an example of an appearance transfer system according to aspects of the present disclosure. The example shown includes user 100, user device 105, image editing apparatus 110, cloud 115, and database 120.

According to the example of FIG. 1, a user 100 provides a source image and a target image via user device 105 and cloud 115. The image editing apparatus 110, which is also connected to the cloud 115, combines appearance features of the source image with non-appearance features of the target image, and provides a combined image back to the user 100.

In one embodiment, the appearance transfer system of FIG. 1 is used to transfer motion from one face to another. Motion transfer in face videos refers to transferring the motion of a driving video to a source face image (or alternatively, transferring the appearance of the source image to the driving or target video). Face motions may include changes in expression, head movements, lip movements (e.g., talking), blinking, etc. The present disclosure describes systems and methods to disentangle latent space of a GAN (e.g., StyleGAN2) into appearance and non-appearance features. In some cases, appearance features represent the characteristics of a face which do not change throughout a video (e.g., identity, hairstyle, glasses, etc.). Similarly, non-appearance features represent characteristics which change within a video (e.g., face pose, facial expression, etc.). The motion of one face can be transferred to a given image after disentanglement by using the appearance features of the source image and the non-appearance features from the frames of the driving video. As a result, high-resolution and high frame-rate motion transfer between a driving video and a source image can be achieved.

Embodiments of the present disclosure include a disentangling network which can separate features of facial images. In some cases, a disentangling network is learned which can separate the features in the form of a GAN latent into appearance and non-appearance representations. For example, the non-appearance features from a video sequence can be combined with the appearance features of the source face image to effectively transfer the motion. In some examples, the image encoder and a GAN may be pre-trained and model parameters are fixed. Additionally, the disentangling network and reconstruction network include a multi-layer neural network.

The user device 105 may be a personal computer, laptop computer, mainframe computer, palmtop computer, personal assistant, mobile device, or any other suitable processing apparatus. In some examples, the user device 105 includes software that transfers appearance features or non-appearance features from one image (or video) to another. For example, the functions described as being performed by the image editing apparatus 110 can also be performed locally at the user device 105.

In some examples, image editing apparatus 110 comprises a server that provides one or more functions to users 100 linked by way of one or more of the various networks. For example, the image editing apparatus 110 can transfer appearance features from a source image to a target image.

In some cases, a server includes a single microprocessor board, which includes a microprocessor responsible for controlling all aspects of the server. In some cases, a server uses microprocessor and protocols to exchange data with other devices/users 100 on one or more of the networks via hypertext transfer protocol (HTTP), and simple mail transfer protocol (SMTP), although other protocols such as file transfer protocol (FTP), and simple network management protocol (SNMP) may also be used. In some cases, a server is configured to send and receive hypertext markup language (HTML) formatted files (e.g., for displaying web pages). In various embodiments, a server comprises a general purpose computing device, a personal computer, a laptop computer, a mainframe computer, a supercomputer, or any other suitable processing apparatus. Image editing apparatus 110 is an example of, or includes aspects of, the corresponding element described with reference to FIG. 4.

A cloud 115 is a computer network configured to provide on-demand availability of computer system resources, such as data storage and computing power. In some examples, the cloud 115 provides resources without active management by the user. The term cloud is sometimes used to describe data centers available to many users over the Internet. Some large cloud networks have functions distributed over multiple locations from central servers. A server is designated an edge server if it has a direct or close connection to a user. In some cases, a cloud 115 is limited to a single organization. In other examples, the cloud 115 is available to many organizations. In one example, a cloud 115 includes a multi-layer communications network comprising multiple edge routers and core routers. In another example, a cloud 115 is based on a local collection of switches in a single physical location.

A database 120 is an organized collection of data. For example, a database 120 can store images (and videos) in a specified format known as a schema. In some cases, the user 100 selects a source image or a target image from the images stored on the database 120. A database 120 may be structured as a single database, a distributed database, multiple distributed databases, or an emergency backup database. In some cases, a database controller may manage data storage and processing in a database 120. In some cases, a user interacts with database controller. In other cases, database controller may operate automatically without user interaction.

Figure 2:
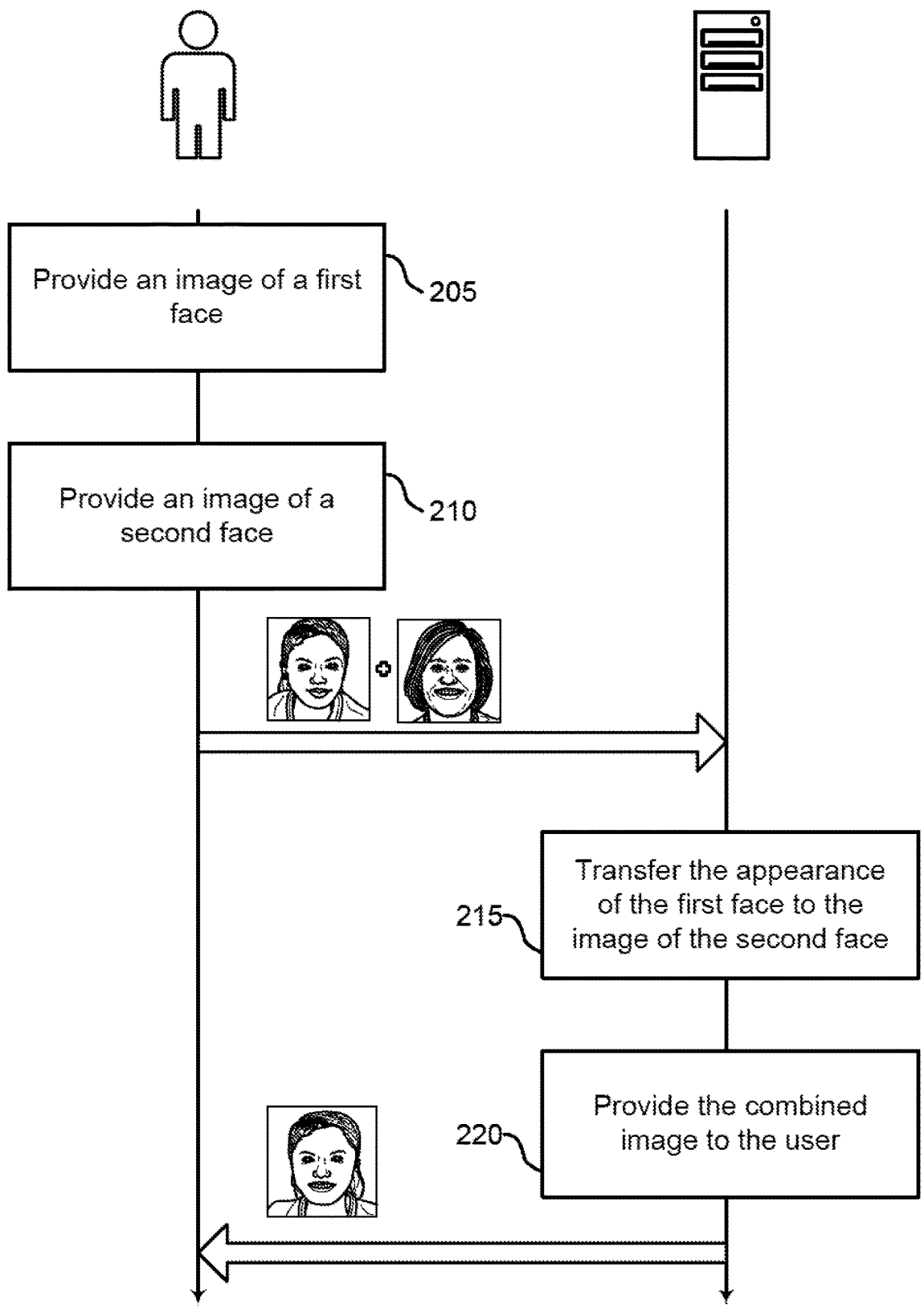
FIG. 2 shows an example of an appearance transfer diagram according to aspects of the present disclosure.

FIG. 2 shows an example of an appearance transfer diagram according to aspects of the present disclosure. The operations of FIG. 2 can be performed by the user 100 and an appearance transfer system such as the image editing apparatus 110 described with reference to FIG. 1.

At operation 205, the user provides an image of a first face. The first face can include appearance features that the user wishes to transfer to another image. In some examples, the user can select an image within an image editing software application, or within a video editing software application. In some cases, the operations of this step refer to, or may be performed by, a user as described with reference to FIG. 1.

At operation 210, the user provides an image of a second face. For example, the user can select a second image that includes a facial expression or position that the user would like to combine with the appearance features of the first face. In some cases, the image of the second face can be drawn from a frame of a video, and the user can select multiple frames of the video so that the first face can be animated to include motion from a face in the video. In some cases, the operations of this step refer to, or may be performed by, a user as described with reference to FIG. 1.

At operation 215, the system transfers the appearance of the first face to the image of the second face. In some examples, the appearance is transferred to each frame of a video. In some examples, the appearance features and non-appearance features are disentangled for both, the image of the first face and the image of the second face. Then the appearance features of the first face can be combined with the non-appearance features (e.g., position or expression) of the second face in a latent space of a GAN. In some cases, the operations of this step refer to, or may be performed by, an image editing apparatus as described with reference to FIGS. 1 and 4.

At operation 220, the system provides the combined image to the user. In some examples, the appearance features of the first face are transferred to multiple frames of a video to create an animation of the first face based on a position or expression of the second face from the video. In some cases, the operations of this step refer to, or may be performed by, an image editing apparatus as described with reference to FIGS. 1 and 4.

Figure 3:
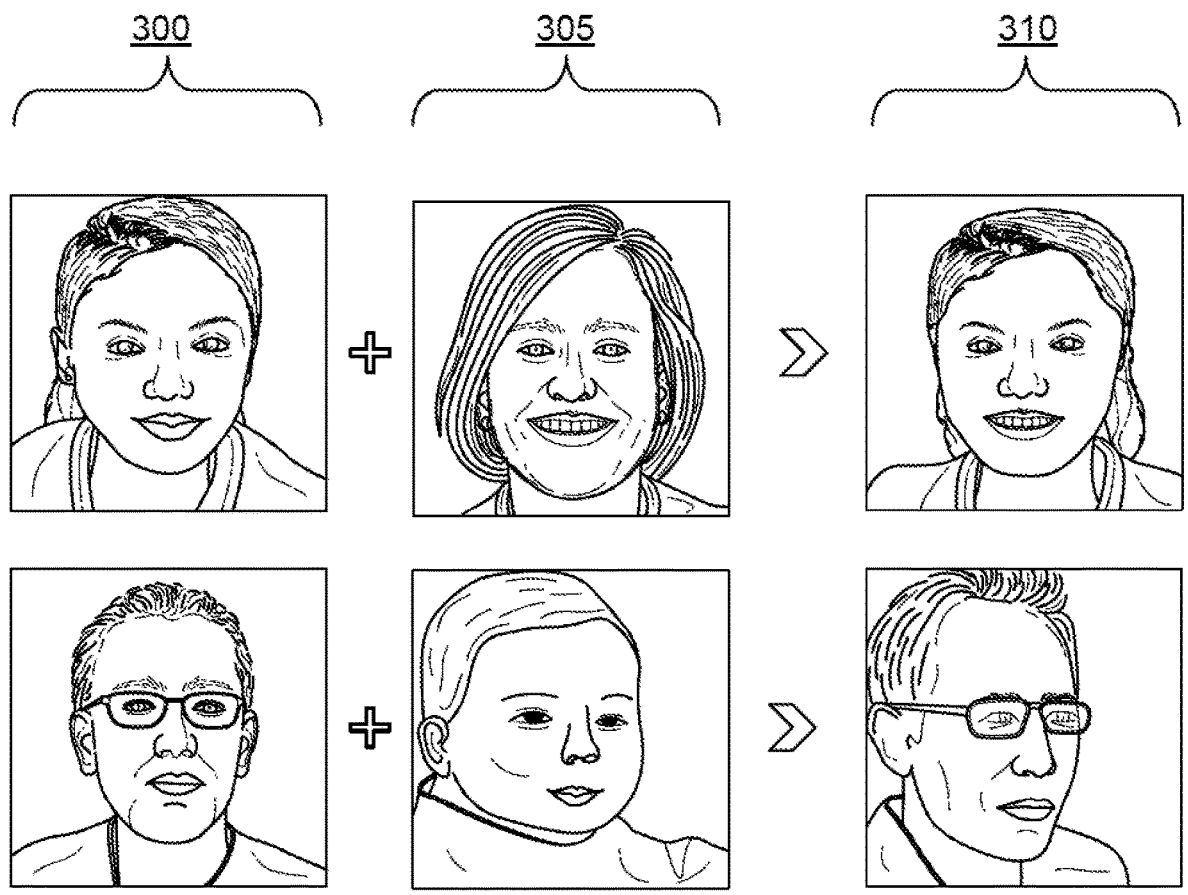
FIG. 3 shows an example of appearance transfer according to aspects of the present disclosure.

FIG. 3 shows an example of appearance transfer according to aspects of the present disclosure. The example shown includes source images 300, target images 305, and combined images 310. Each row in FIG. 3 depicts an independent example of appearance transfer. The source image 300 can be encoded and disentangled to produce both appearance and non-appearance features. Similarly, the target image 305 can be encoded and disentangled to produce both appearance and non-appearance features. Then the appearance features of each source image 300 can be combined with non-appearance features from the corresponding target image 305, and the combined features can be used to generate a combined image 310 (e.g., using a GAN).

In the first row, an appearance of a source image 300 is combined with a smiling expression of the target image 305 to produce a combined image 310 that has appearance features of the source image with a smiling expression. In the second row, an appearance of a source image 300 is combined with a different facial position of the target image 305 to produce a combined image 310 that has appearance features of the source image that is looking to the side.

Architecture

Figure 4:
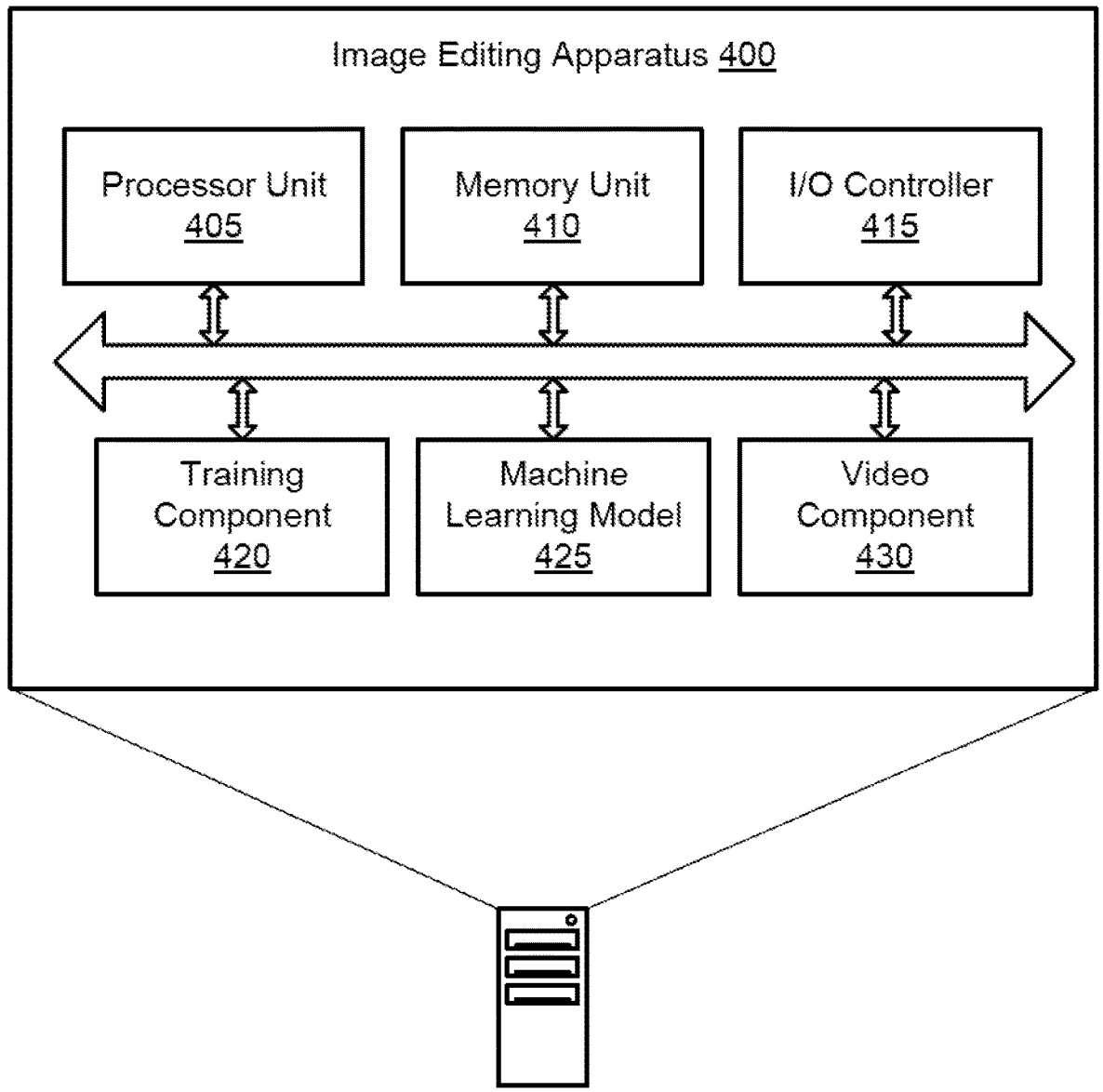
FIG. 4 shows an example of image editing apparatus according to aspects of the present disclosure.
Figure 5:
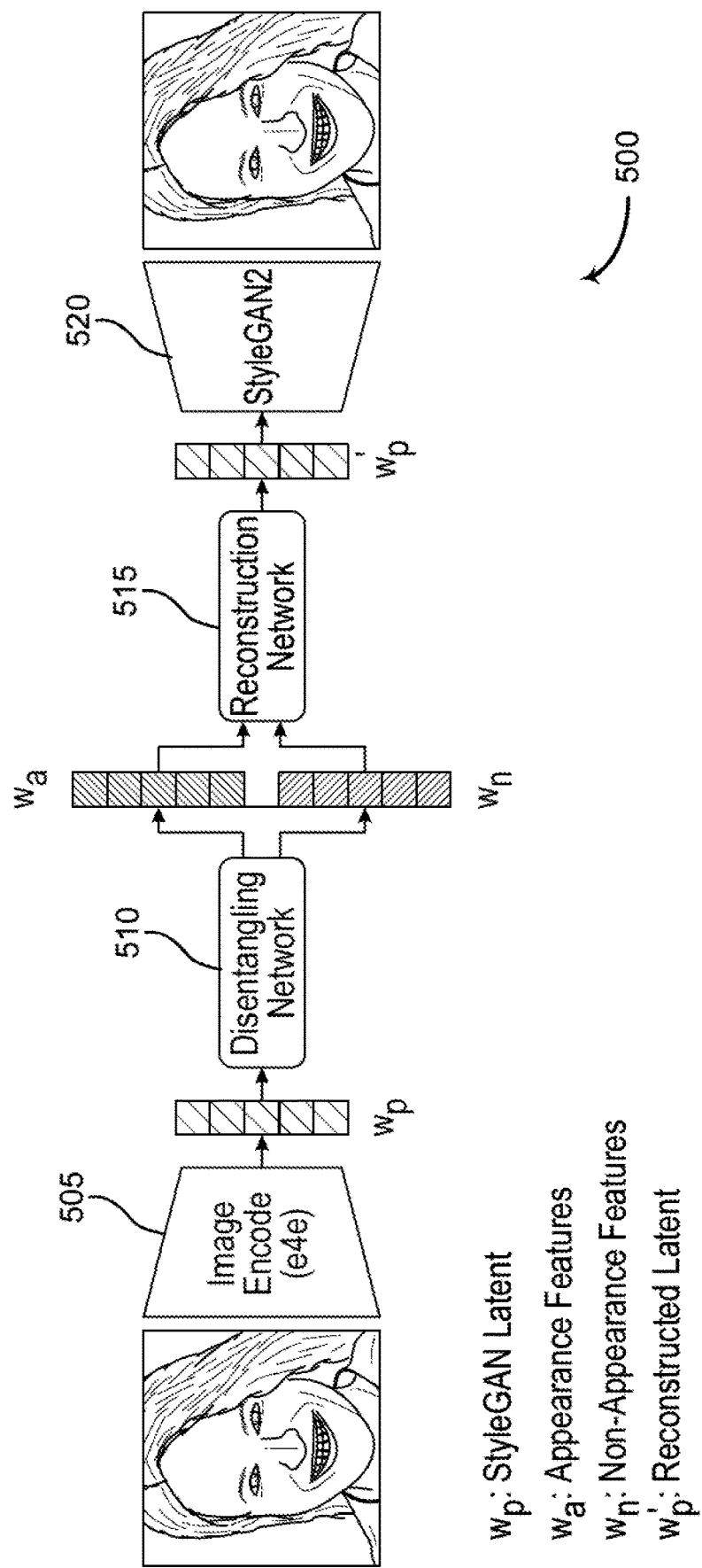
FIG. 5 shows an example of machine learning model according to aspects of the present disclosure.

In FIGS. 4 and 5, an apparatus for image processing is described. One or more embodiments of the apparatus include a disentangling network configured to encode features of a source image to obtain a source appearance encoding and a source non-appearance encoding and to encode features of a target image to obtain a target appearance encoding and a target non-appearance encoding; a reconstruction network configured to combine the source appearance encoding and the target non-appearance encoding to obtain combined image features; and a generator network configured to generate a modified target image based on the combined image features, wherein the modified target image includes inherent attributes of a face in the source image together with contextual attributes of the target image.

Some examples of the apparatus, system, and method further include an image encoder configured to generate the features of the source image and to generate the features of the target image. Some examples of the apparatus, system, and method further include an attribute encoder configured to identify attributes of the source image and the target image. In some aspects, the generator network comprises a generative adversarial network (GAN).

Some examples of the apparatus, system, and method further include a video component configured to extract multiple target frames from a video depicting a target face performing a motion, and to combine multiple modified target frames to obtain a modified video depicting a source face performing the motion. Some examples of the apparatus, system, and method further include a training component configured to jointly train the disentangling network and the reconstruction network.

FIG. 4 shows an example of image editing apparatus 400 according to aspects of the present disclosure. Image editing apparatus 400 is an example of, or includes aspects of, the corresponding element described with reference to FIG. 1. In one embodiment, image editing apparatus 400 includes processor unit 405, memory unit 410, I/O controller 415, training component 420, machine learning model 425, and video component 430.

A processor unit 405 may include an intelligent hardware device, (e.g., a general-purpose processing component, a digital signal processor (DSP), a central processing unit (CPU), a graphics processing unit (GPU), a microcontroller, an application specific integrated circuit (ASIC), a field programmable gate array (FPGA), a programmable logic device, a discrete gate or transistor logic component, a discrete hardware component, or any combination thereof). In some cases, the processor unit 405 is configured to operate a memory array using a memory controller. In other cases, a memory controller is integrated into the processor unit 405. In some cases, the processor unit 405 is configured to execute computer-readable instructions stored in a memory to perform various functions. In some embodiments, a processor unit 405 includes special purpose components for modem processing, baseband processing, digital signal processing, or transmission processing.

Examples of a memory unit 410 include random access memory (RAM), read-only memory (ROM), or a hard disk. Examples of memory unit 410 include solid state memory and a hard disk drive. In some examples, memory unit 410 is used to store computer-readable, computer-executable software including instructions that, when executed, cause a processor to perform various functions described herein. In some cases, the memory unit 410 contains, among other things, a basic input/output system (BIOS) which controls basic hardware or software operation such as the interaction with peripheral components or devices. In some cases, a memory controller operates memory cells. For example, the memory controller can include a row decoder, column decoder, or both. In some cases, memory cells within a memory store information in the form of a logical state.

An I/O controller 415 may manage input and output signals for a device. I/O controller 415 may also manage peripherals not integrated into a device. In some cases, an I/O controller 415 may represent a physical connection or port to an external peripheral. In some cases, an I/O controller 415 may utilize an operating system such as iOS®, ANDROID®, MS-DOS®, MS-WINDOWS®, OS/2®, UNIX®, LINUX®, or another known operating system. In other cases, an I/O controller 415 may represent or interact with a modem, a keyboard, a mouse, a touchscreen, or a similar device. In some cases, an I/O controller 415 may be implemented as part of a processor. In some cases, a user may interact with a device via I/O controller 415 or via hardware components controlled by I/O controller 415.

According to some aspects, training component 420 computes a contrastive loss for the machine learning model 425 (e.g., a disentangling network) based on positive encoding sample pairs and negative encoding sample pairs, where the loss function includes the contrastive loss. In some examples, training component 420 selects an appearance positive sample pair that includes first frames of a video that depict a same face at different times. In some examples, training component 420 selects an appearance negative sample pair that includes second frames that depict different faces. In some examples, training component 420 selects a non-appearance positive sample pair that includes a first version of a frame that comprises a face and a second version of the frame that comprises a visually augmented version of the first version. In some examples, training component 420 selects a non-appearance negative sample pair that includes two frames of a video that depict a same face at different times.

According to some aspects, training component 420 receives a training set including a source image and a target image. In some examples, training component 420 computes a loss function based on the source appearance encoding, the source non-appearance encoding, the target appearance encoding, and the target non-appearance encoding. In some examples, training component 420 updates parameters of the disentangling network based on the loss function.

In some examples, training component 420 combines the source appearance encoding and the source non-appearance encoding to obtain reconstructed source features, and computes a reconstruction loss by comparing the reconstructed source features to the features of the source image, where the loss function includes the reconstruction loss.

In some examples, training component 420 replaces the target appearance encoding with the source appearance encoding, combines the source appearance encoding and the target non-appearance encoding using a reconstruction network to obtain combined image features, and computes a cyclic loss by comparing the cyclic appearance encoding to the source appearance encoding and the cyclic non-appearance encoding to the target non-appearance encoding, where the loss function includes the cyclic loss.

In some examples, training component 420 combines the source appearance encoding with the source non-appearance encoding using a reconstruction network to obtain first reconstructed features, generates first reconstructed attributes from the first reconstructed image, combines the source appearance encoding with the target non-appearance encoding using the reconstruction network to obtain second reconstructed features, generates second reconstructed attributes from the second reconstructed image, and computes an attribute loss by comparing the first reconstructed attributes and the second reconstructed attributes, where the loss function includes the attribute loss.

In some examples, training component 420 computes a gradient of the loss function for the parameters, where the parameters are updated based on the gradient of the loss function. In some examples, training component 420 trains a generator network to generate images based on image features using a generative adversarial loss function, where parameters of the generator network are updated based on the generative adversarial loss function. According to some aspects, training component 420 is configured to jointly train the disentangling network and the reconstruction network.

Machine learning model 425 is an example of, or includes aspects of, the corresponding element described with reference to FIG. 5. In some examples, machine learning model 425 includes an artificial neural network (ANN). An ANN is a hardware or a software component that includes a number of connected nodes (i.e., artificial neurons), which loosely correspond to the neurons in a human brain. Each connection, or edge, transmits a signal from one node to another (like the physical synapses in a brain). When a node receives a signal, it processes the signal and then transmits the processed signal to other connected nodes. In some cases, the signals between nodes comprise real numbers, and the output of each node is computed by a function of the sum of its inputs. Each node and edge is associated with one or more node weights that determine how the signal is processed and transmitted.

During the training process, these weights are adjusted to increase the accuracy of the result (i.e., by minimizing a loss function which corresponds in some way to the difference between the current result and the target result). The weight of an edge increases or decreases the strength of the signal transmitted between nodes. In some cases, nodes have a threshold below which a signal is not transmitted at all. In some examples, the nodes are aggregated into layers. Different layers perform different transformations on their inputs. The initial layer is known as the input layer and the last layer is known as the output layer. In some cases, signals traverse certain layers multiple times.

In some examples, machine learning model 425 includes a convolutional neural network (CNN). A CNN is a class of neural network that is commonly used in computer vision or image classification systems. In some cases, a CNN may enable processing of digital images with minimal pre-processing. A CNN may be characterized by the use of convolutional (or cross-correlational) hidden layers. These layers apply a convolution operation to the input before signaling the result to the next layer. Each convolutional node may process data for a limited field of input (i.e., the receptive field). During a forward pass of the CNN, filters at each layer may be convolved across the input volume, computing the dot product between the filter and the input. During the training process, the filters may be modified so that they activate when they detect a particular feature within the input.

In some examples, machine learning model 425 includes a generative adversarial network (GAN). A GAN is a category of ANN where two neural networks are trained based on a contest with each other. Given a training set, the network learns to generate new data with similar properties as the training set. For example, a GAN trained on photographs can generate new images that look authentic to a human observer. GANs may be used in conjunction with supervised learning, semi-supervised learning, unsupervised learning, and reinforcement learning. In some examples, a GAN includes a generator network and a discriminator network. The generator network generates candidates while the discriminator network evaluates them. The generator network learns to map from a latent space to a data distribution of interest, while the discriminator network distinguishes candidates produced by the generator from the true data distribution. The generator network's training objective is to increase the error rate of the discriminator network (i.e., to produce novel candidates that the discriminator network classifies as real).

Video component 430 can use the output of the machine learning model 425 to generate video files based on the appearance of a face in a source image. In one example, video component 430 extracts a set of target frames from a target video, where each of the set of target frames includes the face of a target image, and generates a modified video based on a modified target frame for each of the set of target frames, where the modified video includes the inherent attributes of the face in the source image together with contextual attributes of the target video.

The described methods may be implemented or performed by devices that include a general-purpose processor, a digital signal processor (DSP), an application specific integrated circuit (ASIC), a field programmable gate array (FPGA) or other programmable logic device, discrete gate or transistor logic, discrete hardware components, or any combination thereof. A general-purpose processor may be a microprocessor, a conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Thus, the functions described herein may be implemented in hardware or software and may be executed by a processor, firmware, or any combination thereof. If implemented in software executed by a processor, the functions may be stored in the form of instructions or code on a computer-readable medium.

Computer-readable media includes both non-transitory computer storage media and communication media including any medium that facilitates transfer of code or data. A non-transitory storage medium may be any available medium that can be accessed by a computer. For example, non-transitory computer-readable media can comprise random access memory (RAM), read-only memory (ROM), electrically erasable programmable read-only memory (EEPROM), compact disk (CD) or other optical disk storage, magnetic disk storage, or any other non-transitory medium for carrying or storing data or code.

Also, connecting components may be properly termed computer-readable media. For example, if code or data is transmitted from a website, server, or other remote source using a coaxial cable, fiber optic cable, twisted pair, digital subscriber line (DSL), or wireless technology such as infrared, radio, or microwave signals, then the coaxial cable, fiber optic cable, twisted pair, DSL, or wireless technology are included in the definition of medium. Combinations of media are also included within the scope of computer-readable media.

FIG. 5 shows an example of machine learning model 500 according to aspects of the present disclosure. Machine learning model 500 is an example of, or includes aspects of, the corresponding element described with reference to FIG. 4. In one aspect, machine learning model 500 includes image encoder 505, disentangling network 510, reconstruction network 515, and generator network 520.

According to some aspects, image encoder 505 encodes the source image to obtain the features of the source image. In some examples, the image features are represented in a latent space of the generator network 520. For example, the image encoder 505 includes a CNN and can encode the source image using a series of convolution operations.

According to some aspects, disentangling network 510 encodes features of an image to obtain an appearance encoding and a non-appearance encoding, where the appearance encoding represents inherent attributes of a face in the image and the non-appearance encoding represents contextual attributes of the image. In some examples, disentangling network 510 also encodes features of a target image to obtain a target appearance encoding and a target non-appearance encoding, where the target appearance encoding represents inherent attributes of a face in the target image and the target non-appearance encoding represents contextual attributes of the target image.

In some examples, disentangling network 510 encodes each of the set of target frames to obtain a target frame appearance encoding and a target frame non-appearance encoding. In some examples, the inherent attributes of the face in the source image include an identity attribute, a hair attribute, an eyewear attribute, an age attribute, a gender expression attribute, or any combination thereof. In some aspects, the contextual attributes of the source image include a pose attribute, an expression attribute, a gaze direction attribute, a lighting attribute, or any combination thereof. According to some aspects, disentangling network 510 encodes combined image features to obtain a cyclic appearance encoding and a cyclic non-appearance encoding.

Reconstruction network 515 combines appearance features (i.e., an appearance encoding) and non-appearance features (i.e., the non-appearance encoding) to obtain a reconstructed latent vector (i.e., a combined encoding of image features). In some examples, reconstruction network 515 combines the source appearance encoding and the target non-appearance encoding to obtain combined image features. According to some aspects, reconstruction network 515 replaces the target appearance encoding with the source appearance encoding.

According to some aspects, generator network 520 generates a modified target image based on the combined image features, where the modified target image includes the inherent attributes of the face in the source image together with the contextual attributes of the target image. In some examples, generator network 520 generates a modified target frame for each of the set of target frames.

According to some aspects, generator network 520 generates a first reconstructed image based on the first reconstructed features. In some examples, generator network 520 generates multiple reconstructed images based on the multiple reconstructed features (e.g., in order to create a video). In some examples, the generator network 520 includes a generative adversarial network (GAN, such as StyleGAN2). Alternatively, any suitable image generation network can be used that is capable of generating an image from a latent space vector.

Inference

Figure 6:
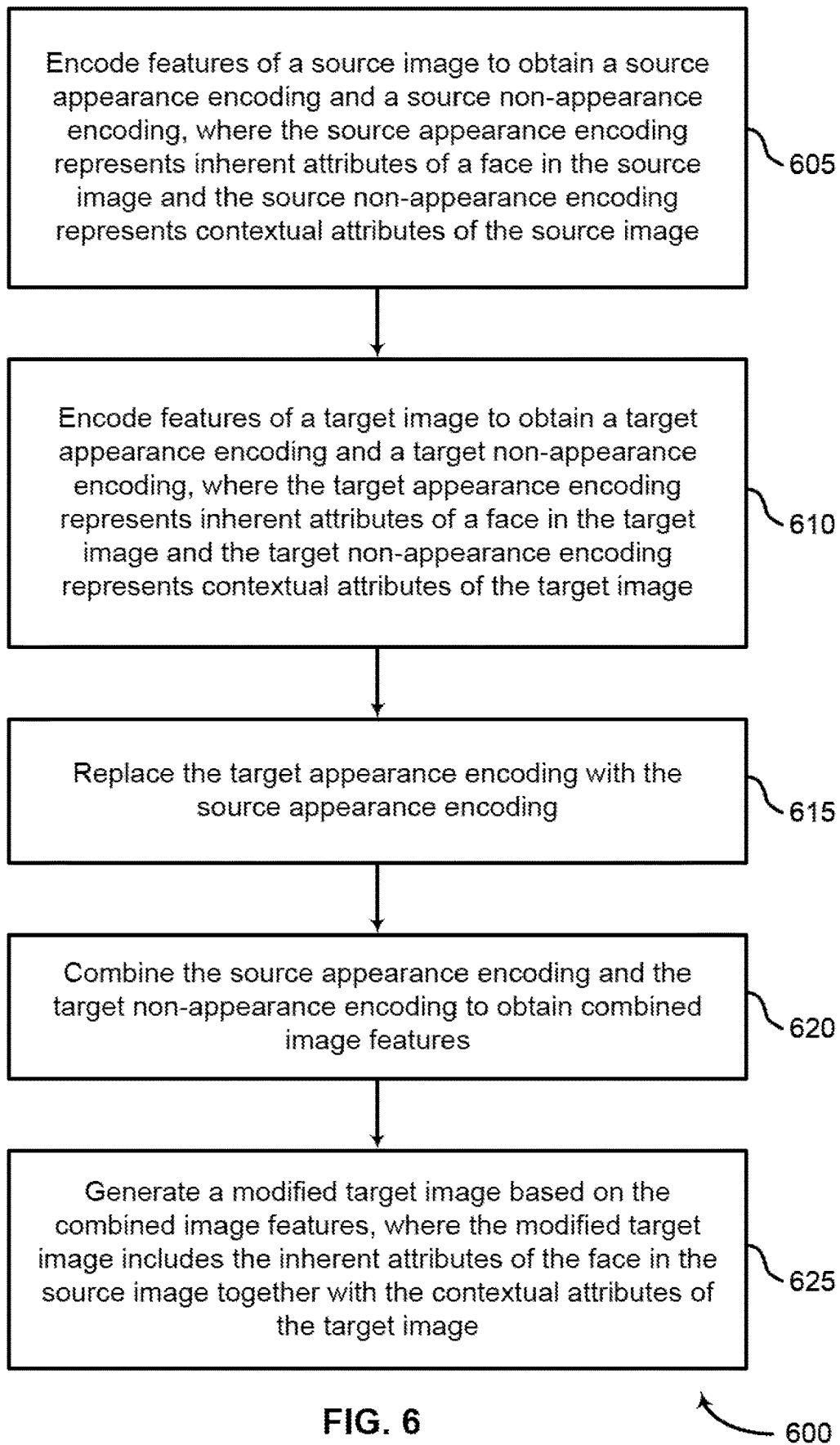
FIG. 6 shows an example of appearance transfer between images according to aspects of the present disclosure.
Figure 7:
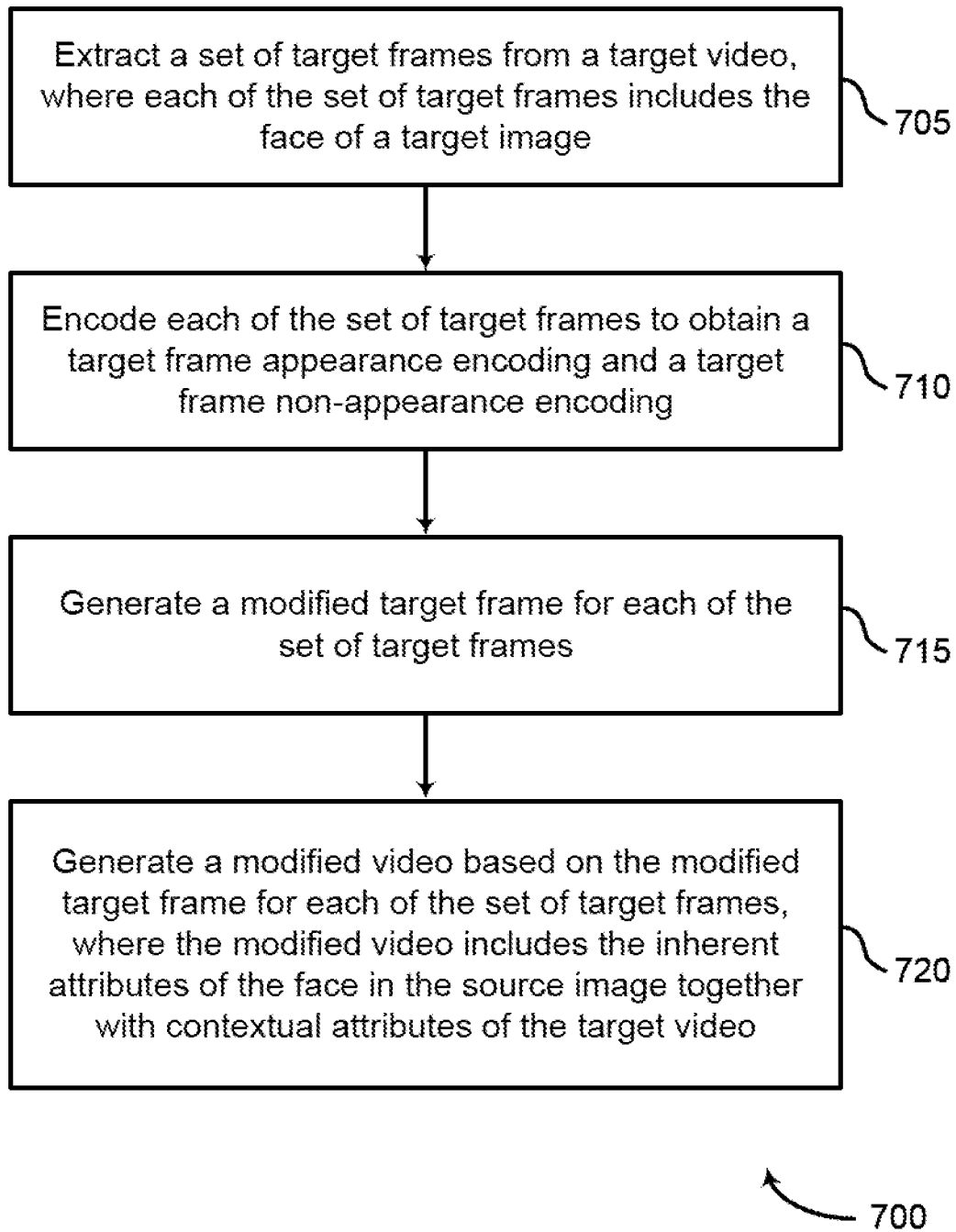
FIG. 7 shows an example of appearance transfer for a video according to aspects of the present disclosure.
Figure 8:
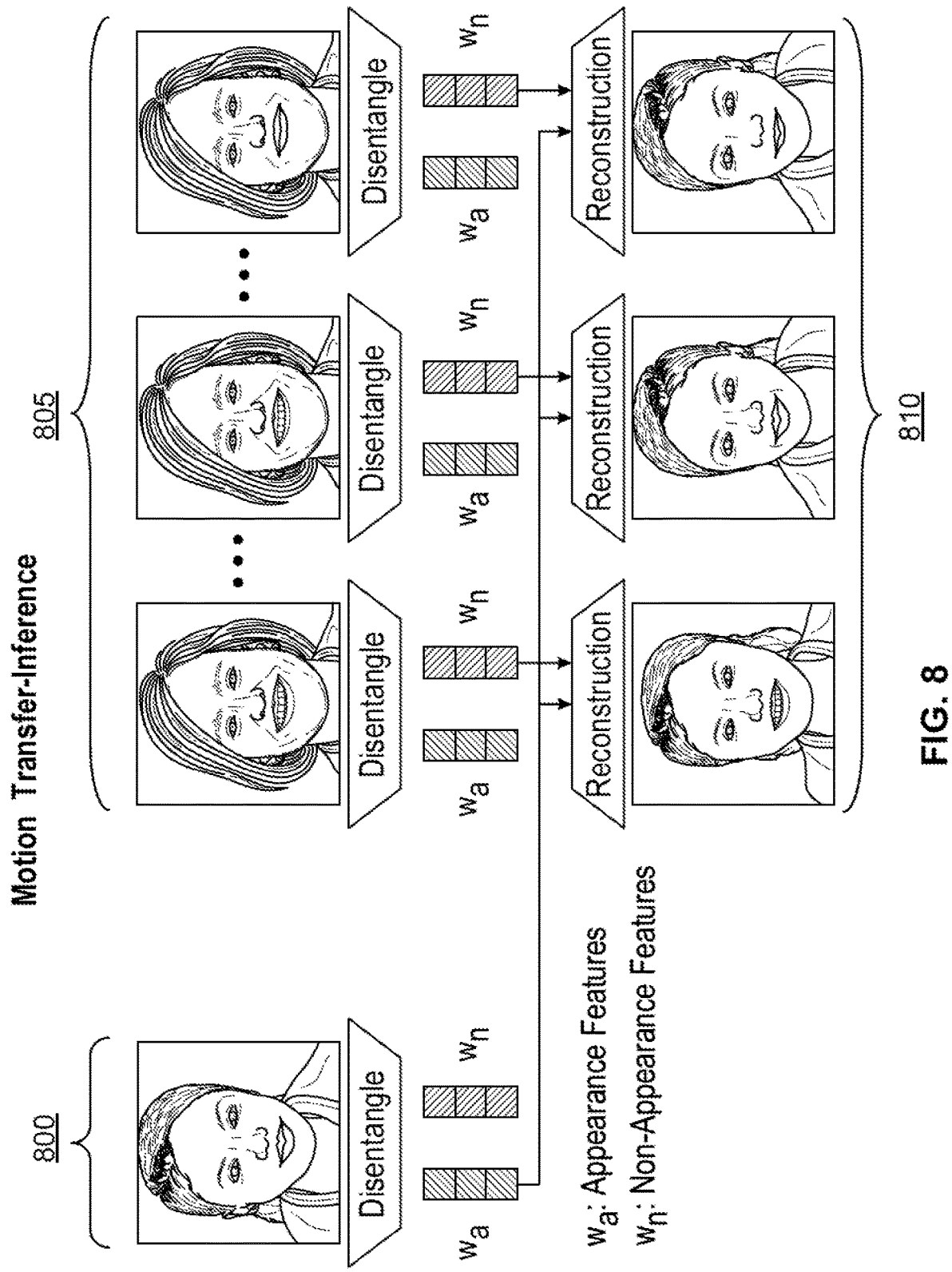
FIG. 8 shows an example of a motion transfer diagram according to aspects of the present disclosure.

In FIGS. 6 through 8, methods for image processing are described. One or more embodiments of the method include encoding features of a source image to obtain a source appearance encoding that represents inherent attributes of a face in the source image; encoding features of a target image to obtain a target non-appearance encoding that represents contextual attributes of the target image; combining the source appearance encoding and the target non-appearance encoding to obtain combined image features; and generating a modified target image based on the combined image features, wherein the modified target image includes the inherent attributes of the face in the source image together with the contextual attributes of the target image.

Some examples of the method, apparatus, non-transitory computer readable medium, and system further include extracting a plurality of target frames from a target video, wherein each of the plurality of target frames includes the face of the target image. Some examples further include encoding each of the plurality of target frames to obtain a target frame appearance encoding and a target frame non-appearance encoding. Some examples further include generating a modified target frame for each of the plurality of target frames. Some examples further include generating a modified video based on the modified target frame for each of the plurality of target frames, wherein the modified video includes the inherent attributes of the face in the source image together with contextual attributes of the target video.

Some examples of the method, apparatus, non-transitory computer readable medium, and system further include encoding the features of the source image to obtain a source non-appearance encoding, wherein the source non-appearance encoding represents contextual attributes of the source image; and encoding the features of the target image to obtain a target appearance encoding, wherein the target appearance encoding represents inherent attributes of a face in the target image.

In some examples, the inherent attributes include an identity attribute, a hair attribute, an eyewear attribute, an age attribute, a gender expression attribute, or any combination thereof. In some examples, the contextual attributes include a pose attribute, an expression attribute, a gaze direction attribute, a lighting attribute, or any combination thereof.

According to an alternative embodiment, a method includes encoding features of a source image to obtain a source appearance encoding and a source non-appearance encoding, wherein the source appearance encoding represents inherent attributes of a face in the source image and the source non-appearance encoding represents contextual attributes of the source image; encoding features of a target image to obtain a target appearance encoding and a target non-appearance encoding, wherein the target appearance encoding represents inherent attributes of a face in the target image and the target non-appearance encoding represents contextual attributes of the target image; replacing the target appearance encoding with the source appearance encoding; combining the source appearance encoding and the target non-appearance encoding to obtain combined image features; and generating a modified target image based on the combined image features, wherein the modified target image includes the inherent attributes of the face in the source image together with the contextual attributes of the target image. Some examples of the method, apparatus, non-transitory computer readable medium, and system further include encoding the source image to obtain the features of the source image.

FIG. 6 shows an example of a method 600 of appearance transfer between images according to aspects of the present disclosure. For example, appearance features of a source image can be transferred onto a target image with different non-appearance features, like facial position. In some examples, these operations are performed by a system including a processor executing a set of codes to control functional elements of an apparatus.

Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 605, the system encodes features of a source image to obtain a source appearance encoding and a source non-appearance encoding, where the source appearance encoding represents inherent attributes of a face in the source image and the source non-appearance encoding represents contextual attributes of the source image. In some cases, the operations of this step refer to, or may be performed by, a disentangling network as described with reference to FIG. 5.

For example, the appearance encoding can encode attributes that represent inherent appearance attributes of a face (i.e., attributes that don't change with context) such as an identity attribute, a hair attribute, an eyewear attribute, an age attribute, or a gender expression attribute. The non-appearance attributes can include attributes of a face that change with context such as a pose attribute, an expression attribute, a gaze direction attribute, or a lighting attribute.

A CNN can be used to encode the appearance and non-appearance attributes. Further detail regarding a method of training an encoder to represent appearance attributes is provided with reference to FIG. 10. Further detail regarding a method of training an encoder to represent non-appearance attributes is provided with reference to FIG. 11.

At operation 610, the system encodes features of a target image to obtain a target appearance encoding and a target non-appearance encoding, where the target appearance encoding represents inherent attributes of a face in the target image and the target non-appearance encoding represents contextual attributes of the target image. In some cases, the operations of this step refer to, or may be performed by, a disentangling network as described with reference to FIG. 5.

In some examples, the appearance and non-appearance attributes of the target image can be encoded using the same encoder that was used to encode the appearance and non-appearance attributes of the source image as discussed with reference to operation 605.

At operation 615, the system replaces the target appearance encoding with the source appearance encoding. At operation 620, the system combines the source appearance encoding and the target non-appearance encoding to obtain combined image features. In some cases, operations 615 and 620 refer to, or may be performed by, a reconstruction network as described with reference to FIG. 5.

In some examples, an artificial neural network such as a CNN is used to combine the source appearance encoding and the target non-appearance encoding. In one embodiment, appearance features from a source image are transferred onto multiple frames from a video to obtain a video that depicts the face of the source image moving in the manner of the face that was originally present in the video. An example of transferring a face onto frames of a video is provided with reference to FIGS. 7 and 8.

At operation 625, the system generates a modified target image based on the combined image features, where the modified target image includes the inherent attributes of the face in the source image together with the contextual attributes of the target image. In some cases, the operations of this step refer to, or may be performed by, a generator network as described with reference to FIG. 5. In some examples, the generator network includes a GAN as described with reference to FIG. 4.

FIG. 7 shows an example of a method 700 of appearance transfer for a video according to aspects of the present disclosure. For example, the method described with reference to FIG. 6 can be applied multiple times, once for each frame of a video to obtain a modified video with a face that has the appearance of a source image and expression or motions similar to those from the original video. Further detail regarding an example process for generating a video based on appearance transfer is described with reference to FIG. 8.

In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 705, the system extracts a set of target frames from a target video, where each of the set of target frames includes the face of a target image. In some cases, the operations of this step refer to, or may be performed by, a video component as described with reference to FIG. 4.

At operation 710, the system encodes each of the set of target frames to obtain a target frame appearance encoding and a target frame non-appearance encoding. In some cases, the operations of this step refer to, or may be performed by, a disentangling network as described with reference to FIG. 5.

At operation 715, the system generates a modified target frame for each of the set of target frames. In some cases, the operations of this step refer to, or may be performed by, a generator network as described with reference to FIG. 5.

At operation 720, the system generates a modified video based on the modified target frame for each of the set of target frames, where the modified video includes the inherent attributes of the face in the source image together with contextual attributes of the target video. In some cases, the operations of this step refer to, or may be performed by, a video component as described with reference to FIG. 4.

FIG. 8 shows an example of a motion transfer diagram according to aspects of the present disclosure. The example shown includes source image 800, video frames 805, and combined frames 810. FIG. 8 shows an example of the process described with reference to FIG. 7.

The source image 800 is encoded and disentangled to generate appearance features and non-appearance features. Then the process is repeated for multiple video frames 805. In some examples, each frame of a video is selected. In other examples, a sample of frames from a video are selected. The video contains an image of a face in motion. For example, the position or expression of the face in the video can change between frames.

The appearance features of the source image 800 are combined with the non-appearance features (e.g., position and expression) of each of the video frames and reconstructed into a vector in the latent space of a GAN using a reconstruction network. The output is a series of modified frames that include the appearance of the face from the source image 800 and the position and expression from the video frames 805. The output frames can then be combined to produce a modified video with the face from the source image 800.

Training and Evaluation

In FIGS. 9 through 12, methods for training a neural network are described. One or more embodiments of the method include receiving a training set including a source image and a target image; encoding features of the source image using a disentangling network to obtain a source appearance encoding and a source non-appearance encoding, wherein the source appearance encoding represents inherent attributes of a face in the source image and the source non-appearance encoding represents contextual attributes of the source image; encoding features of the target image using the disentangling network to obtain a target appearance encoding and a target non-appearance encoding, wherein the target appearance encoding represents inherent attributes of a face in the target image and the target non-appearance encoding represents contextual attributes of the target image; computing a loss function based on the source appearance encoding, the source non-appearance encoding, the target appearance encoding, and the target non-appearance encoding; and updating parameters of the disentangling network based on the loss function.

Some examples of the method, apparatus, non-transitory computer readable medium, and system further include computing a contrastive loss for the disentangling network based on positive encoding sample pairs and negative encoding sample pairs, wherein the loss function includes the contrastive loss. Some examples of the method, apparatus, non-transitory computer readable medium, and system further include selecting an appearance positive sample pair that includes first frames of a video that depict a same face at different times. Some examples further include selecting an appearance negative sample pair that includes second frames that depict different faces.

Some examples of the method, apparatus, non-transitory computer readable medium, and system further include selecting a non-appearance positive sample pair that includes a first version of a frame that comprises a face and a second version of the frame that comprises a visually augmented version of the first version. Some examples further include selecting a non-appearance negative sample pair that includes two frames of a video that depict a same face at different times.

Some examples of the method, apparatus, non-transitory computer readable medium, and system further include combining the source appearance encoding and the source non-appearance encoding to obtain reconstructed source features. Some examples further include computing a reconstruction loss by comparing the reconstructed source features to the features of the source image, wherein the loss function includes the reconstruction loss.

Some examples of the method, apparatus, non-transitory computer readable medium, and system further include replacing the target appearance encoding with the source appearance encoding. Some examples further include combining the source appearance encoding and the target non-appearance encoding using a reconstruction network to obtain combined image features. Some examples further include encoding the combined image features using the disentangling network to obtain a cyclic appearance encoding and a cyclic non-appearance encoding. Some examples further include computing a cyclic loss by comparing the cyclic appearance encoding to the source appearance encoding and the cyclic non-appearance encoding to the target non-appearance encoding, wherein the loss function includes the cyclic loss.

Some examples of the method, apparatus, non-transitory computer readable medium, and system further include combining the source appearance encoding with the source non-appearance encoding using a reconstruction network to obtain first reconstructed features. Some examples further include generating a first reconstructed image based on the first reconstructed features. Some examples further include generating first reconstructed attributes from the first reconstructed image. Some examples further include combining the source appearance encoding with the target non-appearance encoding using the reconstruction network to obtain second reconstructed features. Some examples further include generating a second reconstructed image based on the second reconstructed features. Some examples further include generating second reconstructed attributes from the second reconstructed image. Some examples further include computing an attribute loss by comparing the first reconstructed attributes and the second reconstructed attributes, wherein the loss function includes the attribute loss.

Some examples of the method, apparatus, non-transitory computer readable medium, and system further include computing a gradient of the loss function for the parameters, wherein the parameters are updated based on the gradient of the loss function. Some examples of the method, apparatus, non-transitory computer readable medium, and system further include training a generator network to generate images based on image features using a generative adversarial loss function, wherein parameters of the generator network are updated based on the generative adversarial loss function.

Figure 9:
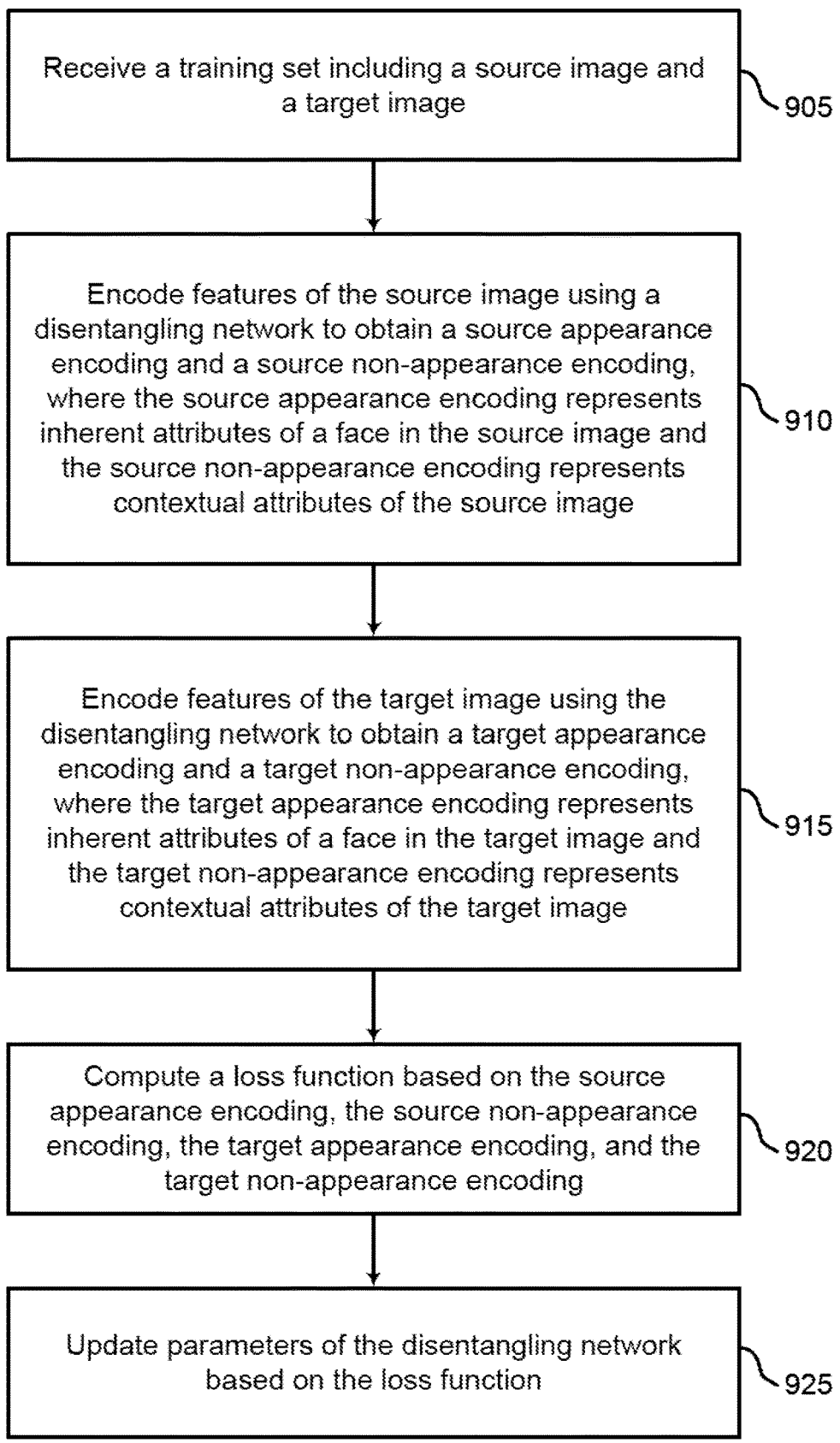
FIG. 9 shows an example of training a neural network according to aspects of the present disclosure.

FIG. 9 shows an example of a method 900 for training a neural network according to aspects of the present disclosure. In some examples, these operations are performed by a system including a processor executing a set of codes to control functional elements of an apparatus. For example, certain portions of the method 900 can be performed by a training component of an image editing apparatus as described with reference to FIG. 4.

Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

Contrastive learning refers to a type of machine learning in which a model is trained using the selection of positive and negative sample pairs. Contrastive learning can be used in both a supervised and unsupervised (e.g., self-supervised) training context. A loss function for a contrastive learning model can encourage a network to generate similar results for positive sample pairs, and dissimilar results for negative sample pairs. In self-supervised examples, positive samples can be generated automatically from input data (e.g., by cropping or transforming an existing image). At operation 905, the system receives a training set including a source image and a target image. In some cases, the operations of this step refer to, or may be performed by, a training component as described with reference to FIG. 4.

At operation 910, the system encodes features of the source image using a disentangling network to obtain a source appearance encoding and a source non-appearance encoding, where the source appearance encoding represents inherent attributes of a face in the source image and the source non-appearance encoding represents contextual attributes of the source image. In some cases, the operations of this step refer to, or may be performed by, a disentangling network as described with reference to FIG. 5.

At operation 915, the system encodes features of the target image using the disentangling network to obtain a target appearance encoding and a target non-appearance encoding, where the target appearance encoding represents inherent attributes of a face in the target image and the target non-appearance encoding represents contextual attributes of the target image. In some cases, the operations of this step refer to, or may be performed by, a disentangling network as described with reference to FIG. 5.

At operation 920, the system computes a loss function based on the source appearance encoding, the source non-appearance encoding, the target appearance encoding, and the target non-appearance encoding. In some cases, the operations of this step refer to, or may be performed by, a training component as described with reference to FIG. 4.

In some examples, a disentangling network is trained using a combination of losses. For example, a contrastive loss can be applied to ensure the appearance features are consistent for a person. In some cases, consistency of appearance features exists with different facial poses or expressions. The loss function is applied such that representations for frames across a video are similar while representations of visually augmented versions of the same person or different people are separated. Additionally, a contrastive loss for non-appearance features ensures that visually augmented versions of the same frame are together, while different frames with the same person are apart. In some cases, a cyclic consistency loss trains the reconstruction network to use appearance and non-appearance features to reconstruct the original input latent.

At operation 925, the system updates parameters of the disentangling network based on the loss function. In some cases, the operations of this step refer to, or may be performed by, a training component as described with reference to FIG. 4.

Figure 10:
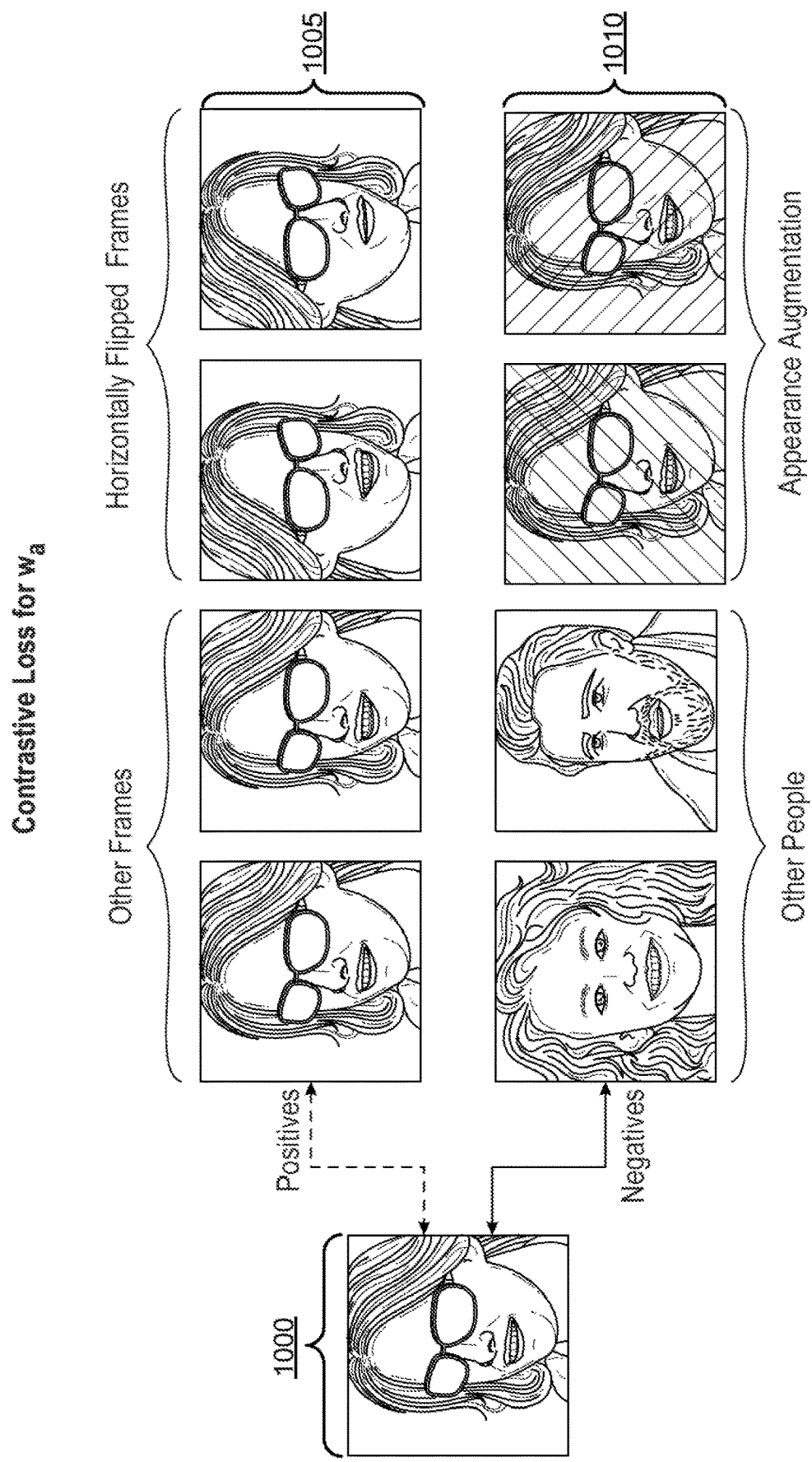
FIG. 10 shows an example of a contrastive loss for appearance attributes according to aspects of the present disclosure.

FIG. 10 shows an example of a contrastive loss for appearance attributes according to aspects of the present disclosure. The example shown includes sample image 1000, positive sample images 1005, and negative sample images 1010.

The example illustrated in FIG. 10 shows that a sample image 1000 from a video can be used to generate positive sample images 1005 by taking other frames of a video. Additionally or alternatively, the sample image 1000 can be flipped or modified to produce positive sample images 1005. As shown in FIG. 10, the other frames or the modified images will still have the same or similar appearance features to those of the sample image 1000, so they can be used to create positive sample pairs for a contrastive learning loss for appearance attributes.

Negative sample images 1010 can be created by selecting images that depict other faces, or by modifying features of the sample image 1000 that would be considered appearance features. In FIG. 10, the modifications reflecting a change in appearance features are depicted using a pattern overlaid on the image. Since the faces of other people, or the modified images that form the negative sample images 1010 have different features from the sample image 1000, they can be used to generate negative sample pairs for a contrastive learning loss for appearance attributes.

Figure 11:
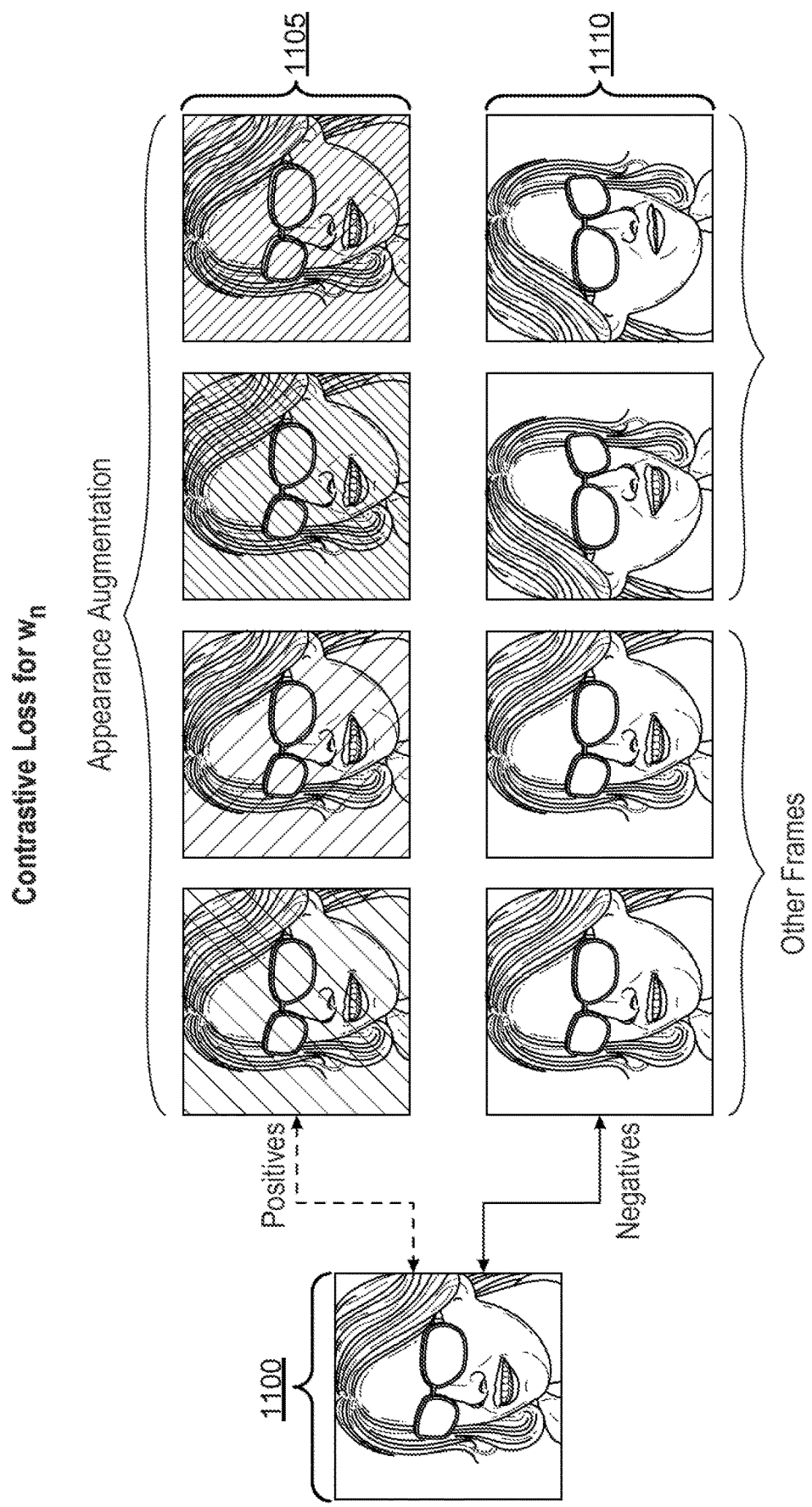
FIG. 11 shows an example of a contrastive loss for non-appearance attributes according to aspects of the present disclosure.

FIG. 11 shows an example of a contrastive loss for non-appearance attributes according to aspects of the present disclosure. The example shown includes sample image 1100, positive sample images 1105, and negative sample images 1110. Note that the method of generating sample pairs from the positive sample images 1105 and negative sample images 1110 for non-appearance attributes can be switched from the method for generating sample pairs for appearance attributes described with reference to FIG. 10.

For the positive sample images 1105, appearance attributes of the original image 1100 can be modified. Since the non-appearance attributes, such as expression or position of the face remain unchanged, the positive sample images 1105 can be used to create positive sample pairs with the sample image 1100 for a contrastive learning loss for non-appearance features.

To create negative sample pairs, other frames of a video including the sample image 1100 can be used that have a different facial position or expression. Additionally or alternatively, different faces can be used as negative samples 1110. Since the other frames have a different position, expression, or other non-appearance attributes from the sample image 1100, they can be used to generate negative sample pairs for a contrastive learning loss for non-appearance features.

Figure 12:
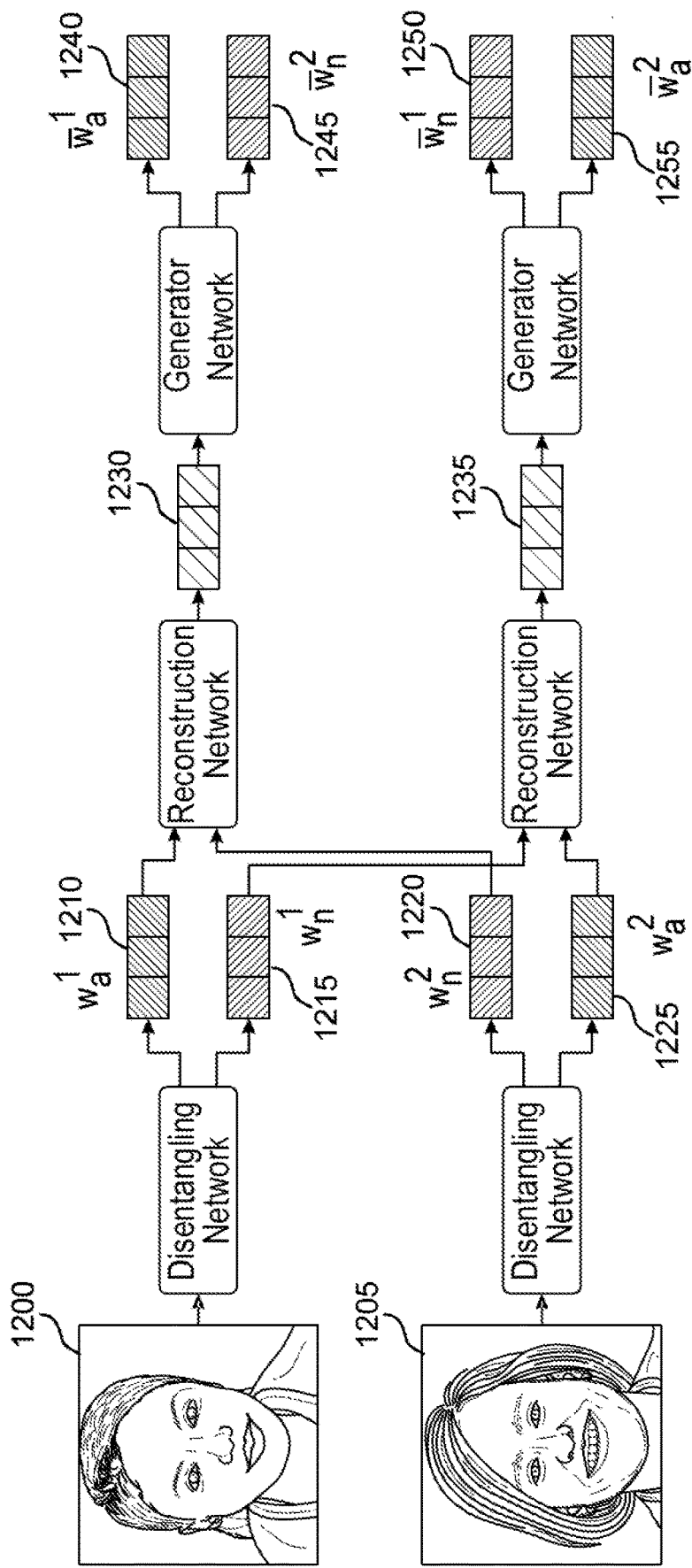
FIG. 12 shows an example of a cyclic loss according to aspects of the present disclosure.

FIG. 12 shows an example of a cyclic loss according to aspects of the present disclosure. The example shown includes first image 1200, second image 1205, first appearance attributes 1210, first non-appearance attributes 1215, second non-appearance attributes 1220, second appearance attributes 1225, first reconstructed vector 1230, second reconstructed vector 1235, first reconstructed appearance attributes 1240, first reconstructed non-appearance attributes 1245, second reconstructed non-appearance attributes 1250, and second reconstructed appearance attributes 1255.

To generate the cyclic loss, features of the first image 1200, second image 1205 can be fed into a disentangling network to generate first appearance attributes 1210, first non-appearance attributes 1215, second non-appearance attributes 1220, and second appearance attributes 1225. Then the first appearance attributes 1210, can be combined with the second non-appearance attributes 1220, while the first non-appearance attributes 1215 can be combined with the second appearance attributes 1225 using a reconstruction network.

The output of the reconstruction network is the first reconstructed vector 1230 and second reconstructed vector 1235. These vectors are in a latent space of a generator network and can be used to generate output images (not shown). The output images can then be used to generate first reconstructed appearance attributes 1240, first reconstructed non-appearance attributes 1245, second reconstructed non-appearance attributes 1250, and second reconstructed appearance attributes 1255 (e.g., using the disentangling network).

Then, a series of comparisons can be made. First appearance attributes 1210 can be compared to first reconstructed appearance attributes 1240; first non-appearance attributes 1215 can be compared to second reconstructed non-appearance attributes 1250; second non-appearance attributes 1220 can be compared to the first reconstructed non-appearance attributes 1245; and second appearance attributes 1225 can be compared to second reconstructed appearance attributes 1255.

For example, the cyclic consistency loss ($L_{cyc}$) ensures that the disentangling network outputs same appearance and non-appearance features when the features have been swapped and reconstructed according to the loss function $L_{cyc} = \|w_a^i - \overline{w}_a^i\|_2^2 + \|w_n^i - \overline{w}_n^i\|_2^2$, where $w_n$ are appearance features and w n are non-appearance features. In some examples, a consistency loss based on a 3D morphable model (3DMM) ensures images generated using same appearance features have the same identity and texture. Similarly, images generated using same non-appearance features can have the same expression and pose.

Accordingly, the present disclosure describes systems and methods for transfer of motion from a video to a given source image. Embodiments of the disclosure include a method to disentangle the latent space of a GAN-based network into appearance and non-appearance features. In some cases, a combination of losses is used for network learning. The network model ensures the consistency of appearance and non-appearance features in the generated faces.

The description and drawings described herein represent example configurations and do not represent all the implementations within the scope of the claims. For example, the operations and steps may be rearranged, combined, or otherwise modified. Also, structures and devices may be represented in the form of block diagrams to represent the relationship between components and avoid obscuring the described concepts. Similar components or features may have the same name but may have different reference numbers corresponding to different figures.

Some modifications to the disclosure may be readily apparent to those skilled in the art, and the principles defined herein may be applied to other variations without departing from the scope of the disclosure. Thus, the disclosure is not limited to the examples and designs described herein, but is to be accorded the broadest scope consistent with the principles and novel features disclosed herein.

In this disclosure and the following claims, the word "or" indicates an inclusive list such that, for example, the list of X, Y, or Z means X or Y or Z or XY or XZ or YZ or XYZ. Also the phrase "based on" is not used to represent a closed set of conditions. For example, a step that is described as "based on condition A" may be based on both condition A and condition B. In other words, the phrase "based on" shall be construed to mean "based at least in part on." Also, the words "a" or "an" indicate "at least one."

What is claimed is:

1. A method for image processing, comprising:
    encoding features of a source image to obtain a source appearance encoding that represents inherent attributes of a face in the source image;
    encoding features of a target image to obtain a target non-appearance encoding that represents contextual attributes of the target image;
    combining the source appearance encoding and the target non-appearance encoding using a reconstruction network to obtain combined image features, wherein the combined image features comprise a reconstructed vector in a latent space of a generator network; and
    generating, using the generator network, a modified target image based on the combined image features, wherein the modified target image includes the inherent attributes of the face in the source image together with the contextual attributes of the target image.

2. The method of claim 1, further comprising:
    extracting a plurality of target frames from a target video, wherein each of the plurality of target frames includes the face of the target image;
    encoding each of the plurality of target frames to obtain a target frame appearance encoding and a target frame non-appearance encoding;
    generating a modified target frame for each of the plurality of target frames based on corresponding combined image features; and
    generating a modified video depicting the face in motion based on the modified target frame for each of the plurality of target frames, wherein the modified video includes the inherent attributes of the face in the source image together with contextual attributes of the target video.

3. The method of claim 1, further comprising:
    encoding the features of the source image to obtain a source non-appearance encoding, wherein the source non-appearance encoding represents contextual attributes of the source image; and
    encoding the features of the target image to obtain a target appearance encoding, wherein the target appearance encoding represents inherent attributes of a face in the target image.

4. The method of claim 1, wherein:
    the inherent attributes include an identity attribute, a hair attribute, an eyewear attribute, an age attribute, a gender expression attribute, or any combination thereof.

5. The method of claim 1, wherein:
    the contextual attributes include a pose attribute, an expression attribute, a gaze direction attribute, a lighting attribute, or any combination thereof.

6. The method of claim 1, wherein:
    the features of the source image and the features of the target image comprise vectors in the latent space of the generator network.

7. The method of claim 1, wherein:
    the source appearance encoding and the target non-appearance encoding are generated by a disentangling network.

8. An apparatus comprising:
    at least one processor; and
    at least one memory including instructions executable by the at least one processor to:
        encode features of a source image to obtain a source appearance encoding that represents inherent attributes of a face in the source image;
        encode features of a target image to obtain a target non-appearance encoding that represents contextual attributes of the target image;
        combine the source appearance encoding and the target non-appearance encoding using a reconstruction network to obtain combined image features, wherein the combined image features comprise a reconstructed vector in a latent space of a generator network; and
        generate, using the generator network, a modified target image based on the combined image features, wherein the modified target image includes the inherent attributes of the face in the source image together with the contextual attributes of the target image.

9. The apparatus of claim 8, further comprising instructions executable by the at least one processor to:
    extract a plurality of target frames from a target video, wherein each of the plurality of target frames includes the face of the target image;
    encode each of the plurality of target frames to obtain a target frame appearance encoding and a target frame non-appearance encoding;
    generate a modified target frame for each of the plurality of target frames based on corresponding combined image features; and
    generate a modified video depicting the face in motion based on the modified target frame for each of the plurality of target frames, wherein the modified video includes the inherent attributes of the face in the source image together with contextual attributes of the target video.

10. The apparatus of claim 8, further comprising instructions executable by the at least one processor to:
    encode the features of the source image to obtain a source non-appearance encoding, wherein the source non-appearance encoding represents contextual attributes of the source image; and
    encode the features of the target image to obtain a target appearance encoding, wherein the target appearance encoding represents inherent attributes of a face in the target image.

11. The apparatus of claim 8, wherein:
    the inherent attributes include an identity attribute, a hair attribute, an eyewear attribute, an age attribute, a gender expression attribute, or any combination thereof.

12. The apparatus of claim 8, wherein:
    the contextual attributes include a pose attribute, an expression attribute, a gaze direction attribute, a lighting attribute, or any combination thereof.

13. A non-transitory computer readable medium storing code for image processing, the code comprising instructions executable by at least one processor to:
    encode features of a source image to obtain a source appearance encoding that represents inherent attributes of a face in the source image;

encode features of a target image to obtain a target non-appearance encoding that represents contextual attributes of the target image;

combine the source appearance encoding and the target non-appearance encoding using a reconstruction network to obtain combined image features, wherein the combined image features comprise a reconstructed vector in a latent space of a generator network; and generate, using the generator network, a modified target image based on the combined image features, wherein the modified target image includes the inherent attributes of the face in the source image together with the contextual attributes of the target image.

14. The non-transitory computer readable medium of claim 13, the code further comprising instructions executable by the at least one processor to:

extract a plurality of target frames from a target video, wherein each of the plurality of target frames includes the face of the target image;

encode each of the plurality of target frames to obtain a target frame appearance encoding and a target frame non-appearance encoding;

generate a modified target frame for each of the plurality of target frames based on corresponding combined image features; and generate a modified video depicting the face in motion based on the modified target frame for each of the plurality of target frames, wherein the modified video includes the inherent attributes of the face in the source image together with contextual attributes of the target video.

15. The non-transitory computer readable medium of claim 13, the code further comprising instructions executable by the at least one processor to:

encode the features of the source image to obtain a source non-appearance encoding, wherein the source non-appearance encoding represents contextual attributes of the source image; and encode the features of the target image to obtain a target appearance encoding, wherein the target appearance encoding represents inherent attributes of a face in the target image.

16. The non-transitory computer readable medium of claim 13, wherein:

the inherent attributes include an identity attribute, a hair attribute, an eyewear attribute, an age attribute, a gender expression attribute, or any combination thereof.

17. The non-transitory computer readable medium of claim 13, wherein:

the contextual attributes include a pose attribute, an expression attribute, a gaze direction attribute, a lighting attribute, or any combination thereof.

* * * * *